US010218905B2

(12) United States Patent
Eromaki et al.

(10) Patent No.: US 10,218,905 B2
(45) Date of Patent: Feb. 26, 2019

(54) SLIDING ACCESSORY LENS MOUNT WITH AUTOMATIC MODE ADJUSTMENT

(71) Applicant: Nokia Technologies Oy, Espoo (FI)

(72) Inventors: Marko Eromaki, Tampere (FI); Tom Pylkkanen, Kaarina (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/772,531

(22) PCT Filed: Mar. 6, 2013

(86) PCT No.: PCT/FI2013/050241
§ 371 (c)(1),
(2) Date: Sep. 3, 2015

(87) PCT Pub. No.: WO2014/135739
PCT Pub. Date: Sep. 12, 2014

(65) Prior Publication Data
US 2016/0006934 A1    Jan. 7, 2016

(51) Int. Cl.
*H04N 5/232*   (2006.01)
*G02B 7/14*   (2006.01)
(Continued)

(52) U.S. Cl.
CPC ......... *H04N 5/23245* (2013.01); *G02B 7/021* (2013.01); *G02B 7/023* (2013.01);
(Continued)

(58) Field of Classification Search
CPC .. H04N 5/23209; H04N 5/23216; G02B 7/02; G02B 7/021; G02B 7/14;
(Continued)

(56) References Cited

U.S. PATENT DOCUMENTS 4,728,973 A *   3/1988   Taniguchi ............. G03B 19/07
                                                    396/544
7,525,592 B2 *   4/2009   Kato ..................... H04N 5/2351
                                                    348/229.1
(Continued)

FOREIGN PATENT DOCUMENTS

CN   101551581 A   10/2009
CN   101236349 B    5/2011
(Continued)

*Primary Examiner* — Lin Ye
*Assistant Examiner* — Chriss S Yoder, III
(74) *Attorney, Agent, or Firm* — Harrington & Smith

(57) ABSTRACT

In accordance with an example embodiment of the present invention, an apparatus is provided with: an accessory lens mount configured to movably attach to a camera, the camera having an objective; a plurality of different optical elements attached to the accessory lens mount such that each of the different optical elements is movable to a co-operating position with the objective by the accessory lens mount to a corresponding position by a user; and an optical mode indicator configured to enable automatic optical mode adjustment of the camera to suit with the optics formed by the objective and the optical element that is moved to the co-operating position with the objective.

26 Claims, 5 Drawing Sheets

(51) Int. Cl.
  *G02B 7/02* (2006.01)
  *G02B 15/10* (2006.01)
  *H04M 1/02* (2006.01)
  *G03B 17/56* (2006.01)
  *G02B 13/00* (2006.01)
  *H04N 5/225* (2006.01)

(52) U.S. Cl.
  CPC ............ *G02B 7/14* (2013.01); *G02B 13/001* (2013.01); *G02B 15/10* (2013.01); *G03B 17/56* (2013.01); *G03B 17/565* (2013.01); *G03B 17/566* (2013.01); *H04M 1/0264* (2013.01); *H04N 5/2254* (2013.01); *H04N 5/2256* (2013.01); *H04N 5/23216* (2013.01)

(58) Field of Classification Search
  CPC ........ G02B 7/16; G03B 17/56; G03B 17/565; G03B 17/566; G03B 17/568
  See application file for complete search history.

(56) References Cited

U.S. PATENT DOCUMENTS

| | | | | |
|---|---|---|---|---|
| 8,279,544 | B1* | 10/2012 | O'Neill | G02B 7/14 359/819 |
| 9,001,176 | B2* | 4/2015 | Springer | G03B 17/14 348/14.02 |
| 9,019,420 | B2* | 4/2015 | Hurst | H04M 1/0264 348/337 |
| 9,568,708 | B2* | 2/2017 | Springer | G02B 7/16 |
| 2005/0101348 | A1* | 5/2005 | Wang | G02B 13/001 455/556.1 |
| 2006/0233545 | A1* | 10/2006 | Senba | G03B 17/14 396/529 |
| 2009/0143099 | A1* | 6/2009 | Kang | G03B 17/14 455/556.1 |
| 2009/0181729 | A1 | 7/2009 | Griffin, Jr. et al. | 455/575.1 |
| 2012/0099015 | A1* | 4/2012 | Viinikanoja | G02B 13/009 348/344 |
| 2012/0147193 | A1 | 6/2012 | Tsai | 348/164 |
| 2013/0177304 | A1* | 7/2013 | Chapman | G03B 17/565 396/533 |
| 2014/0132832 | A1* | 5/2014 | Adams | G06F 3/02 348/376 |

FOREIGN PATENT DOCUMENTS

JP   2008-167205   7/2008
WO   WO 2011/123861 A2   10/2011

* cited by examiner

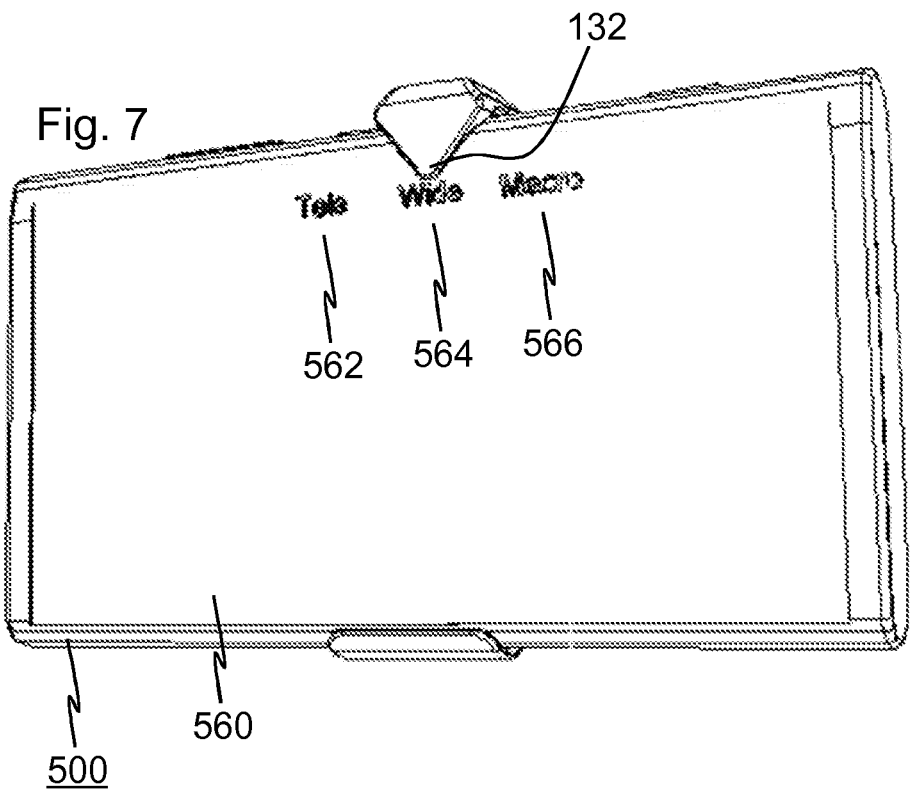
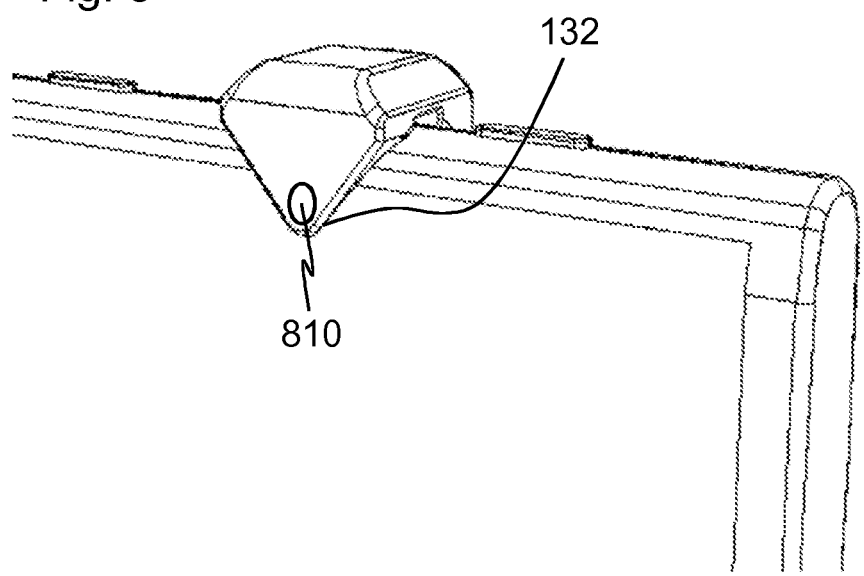

SLIDING ACCESSORY LENS MOUNT WITH AUTOMATIC MODE ADJUSTMENT

TECHNICAL FIELD

The present application generally relates to a sliding accessory lens mount. In particular, though not exclusively, the present application relates to a sliding accessory lens mount with automatic mode adjustment.

BACKGROUND

Cameras have become very common thanks to the rapid development of camera technology, especially with the advances of digital imaging. In present era, people perceive term camera rather as a small digital device than as a larger unit with a film being exposed and later processed to photographs.

Whereas digital image sensors have succeeded film as the prevailing technique for recording an image, the image is still formed using objectives that closely correspond to those developed over past decades. The digital image sensors are typically much smaller than the normal film surfaces that were exposed and likewise the optics are also smaller in digital cameras. Still, most of the present cameras are supplied with fixed optics that is not changeable by the user, while more advanced photographers can chose a model with replaceable optics.

There are also add-on accessories that enable the user to change the optics e.g. by revolving a rotating disc with two or more different objectives.

SUMMARY

Various aspects of examples of the invention are set out in the claims.

According to a first example aspect of the present invention, there is provided an apparatus comprising:
an accessory lens mount configured to movably attach to a camera, the camera having an objective;
a plurality of different optical elements attached to the accessory lens mount such that each of the different optical elements is movable to a co-operating position with the objective by the accessory lens mount to a corresponding position by a user; and
an optical mode indicator configured to enable automatic optical mode adjustment of the camera to suit with the optics formed by the objective and the optical element that is moved to the co-operating position with the objective.

According to a second example aspect of the present invention, there is provided a device comprising:
an objective;
an image capture unit;
an optical mode indication input configured to receive an optical mode indication from
an optical mode indicator, when an accessory lens mount is attached to the device such that one of different optical elements is moved to a co-operating position with the objective;
a processor configured to automatically determine one or more imaging parameters based on the optical mode indication and to correspondingly control the operation of one or more of the objective; and the image capture unit.

According to a third example aspect of the present invention, there is provided a system comprising the apparatus of the first example aspect and the device of the second example aspect.

According to a fourth example aspect of the present invention, there is provided a method comprising:
detecting attaching of an accessory lens mount movably to a camera, the camera having an objective; wherein the accessory lens mount has a plurality of different optical elements attached thereto such that each of the different optical elements is movable to a co-operating position with the objective by the accessory lens mount to a corresponding position by a user;
indicating optical mode of optics of the camera; and
automatically adjusting optical mode of the camera to suit with the optics formed by the objective and the optical element that is moved to the co-operating position with the objective.

According to a fifth example aspect of the present invention, there is provided a method comprising:
in a camera having an objective and an image capture unit:
receiving an optical mode indication from an optical mode indicator from an accessory lens mount, when the accessory lens mount is attached to the device such that one of different optical elements is moved to a co-operating position with the objective;
automatically determining one or more imaging parameters based on the optical mode indication; and correspondingly controlling the operation of one or more of the objective; and the image capture unit.

According to a sixth example aspect of the present invention, there is provided a computer program comprising:
code for causing a computer, when running the program, to perform the method of any example aspect of the invention.

According to a seventh example aspect of the present invention, there is provided a non-transitory computer readable memory medium comprising the computer program of the sixth example embodiment.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIG. 7 shows another perspective view of the system of FIG. 5 in the second configuration;

FIG. 8 shows in detail a portion of the system of an example embodiment of the invention;

DETAILED DESCRIPTION OF THE DRAWINGS

An example embodiment of the present invention and its potential advantages are understood by referring to FIGS. 1 through 10 of the drawings. In this document, like reference signs denote like parts or steps. Various considerations related to different example embodiments are next described in groups such as structural considerations, mode indication, detection of apparatus attachment and/or mode, mode indication, flash light adaptation, and camera operation. It is intended to describe various embodiments related to identified subject matter rather than to imply that the presence of thus titled groups or their members be essential. To the contrary, it should be borne in mind that the various examples and features can be freely combined.

Structural Considerations

Figure 1:
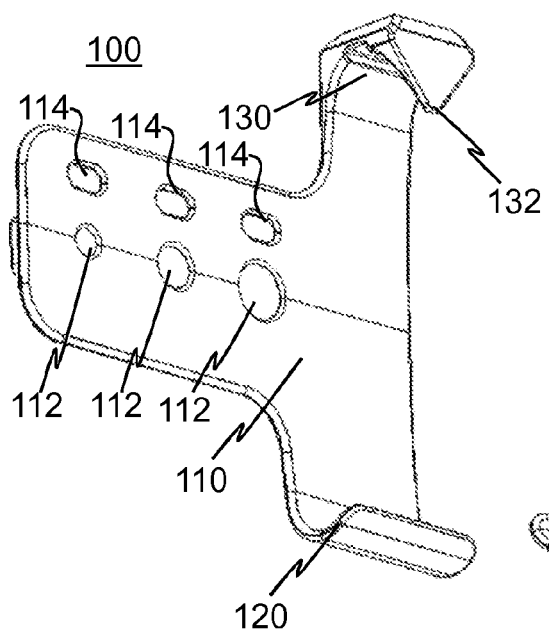
FIG. 1 shows a perspective view of an apparatus of an example embodiment of the invention.

FIG. 1 shows a perspective view of an apparatus 100 of an example embodiment of the invention. The apparatus 100 of this example embodiment is an add-on apparatus. The apparatus 100 comprises a moveable (e.g. slidable) accessory lens mount 110 configured to movably attach to a camera (see FIG. 5, camera 500), the camera having an objective (reference sign 540 in FIG. 5). The apparatus comprises first and second end parts 120, 130 configured to attach to opposite sides of the camera 500. The second end part 130 is configured to extend onto reach a display (560 in FIG. 7) of the camera 500 and thus form a mode indicator 132 for illustrating current imaging mode to a user. Further, FIG. 1 shows two groups of openings formed by the apparatus 100. First openings 112 are suited for respective optical elements (reference signs 210, 220, 230 in FIG. 2) and second openings 114 are suited for respective flash light adaptors (reference signs 240, 250, 260 in FIG. 2).

Instead of openings, windows made of optically transparent material can be provided in place of some of the first and second openings. In yet further example embodiment, the accessory lens mount 110 is formed of optically transparent material such as clear polycarbonate plastic, glass, and/or acryl plastic, in which case no separate windows or openings need necessarily be provided.

Figure 2:
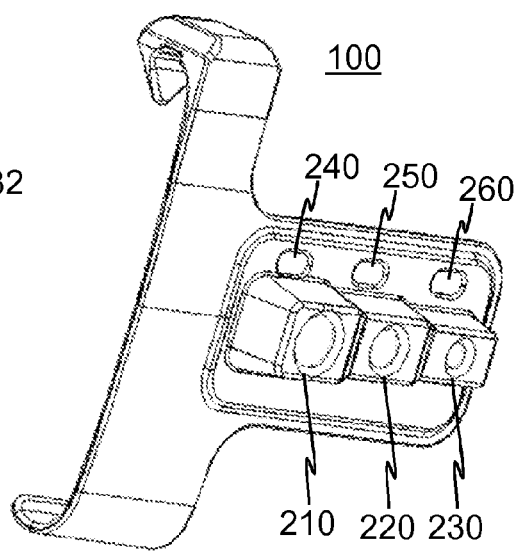
FIG. 2 shows another perspective view of the apparatus of FIG. 1.
Figure 3:
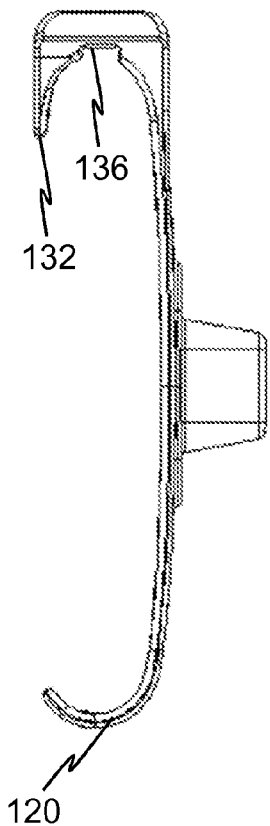
FIG. 3 shows another view of the apparatus of FIG. 1.
Figure 4:
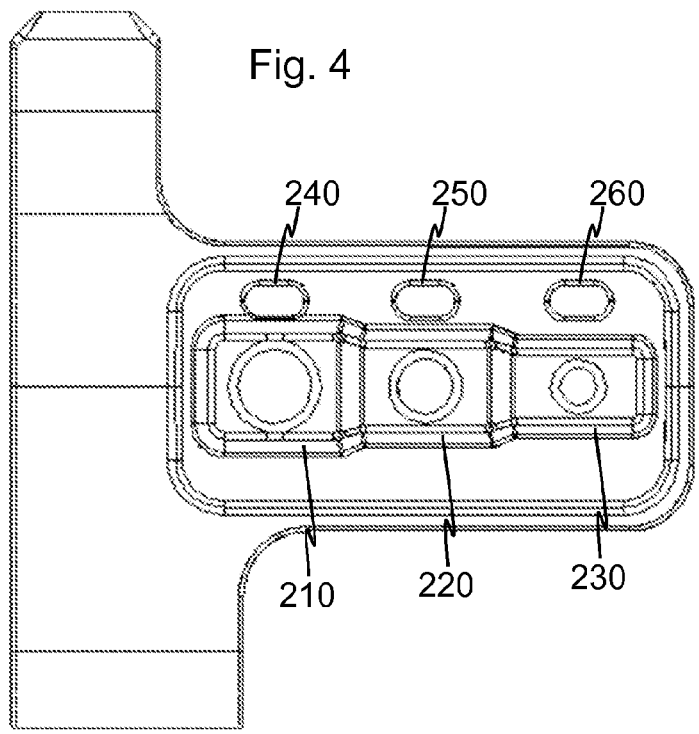
FIG. 4 shows another view of the apparatus of FIG. 1.

FIGS. 2 to 4 show different views of the apparatus 100. As mentioned in the preceding paragraph, the apparatus 100 comprises a plurality of different optical elements 210, 220, 230 attached to the accessory lens mount 110 such that each of the different optical elements is movable to a co-operating position with the objective 540 by the accessory lens mount 110 to a corresponding position by the user. In the embodiment of FIGS. 1 to 4, the apparatus further has the flash light adaptors 240, 250, 260 correspondingly aligned. When one of the optical elements is aligned with the objective 540, a corresponding flash light adaptor is aligned with the flash light (reference sign 550 in FIG. 5) of the camera.

FIG. 3 shows also a groove 136 formed by the second end part 130. This groove is provided in this example embodiment to allow sliding the apparatus 100 along the camera without actuating buttons (510, 520, 530 in FIG. 5) of the camera aligned on a corresponding line.

Figure 5:
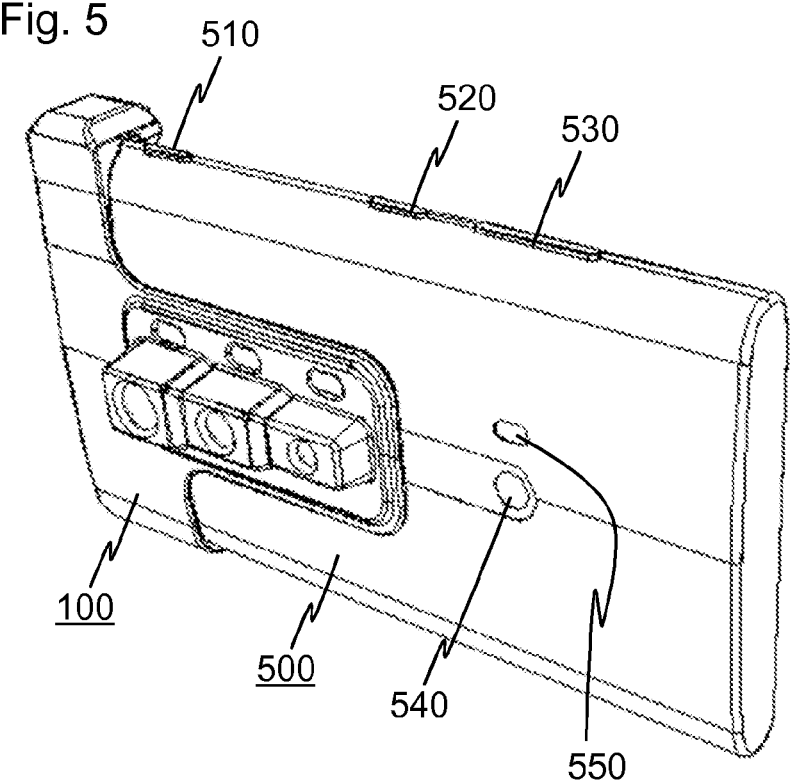
FIG. 5 shows a perspective view of a system of an example embodiment of the invention in a first configuration.
Figure 6:
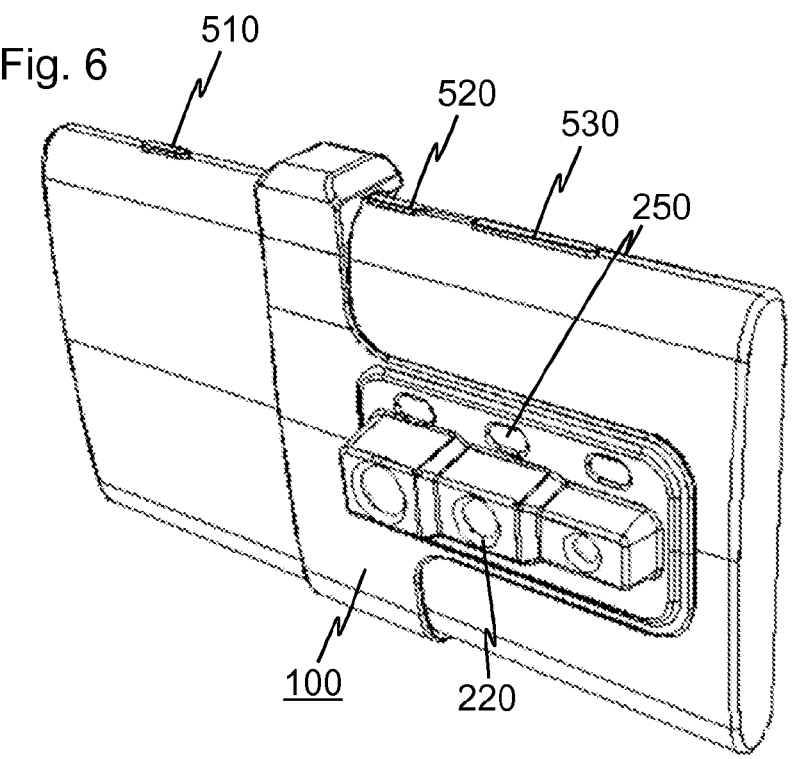
FIG. 6 shows a perspective view of a system of an example embodiment of the invention in a second configuration.

FIGS. 5 and 6 show perspective views of a system of an example embodiment of the invention. The system comprises the apparatus 100 and the camera 500. In a first configuration shown in FIG. 5, the apparatus 100 is attached to the camera 500 but not yet moved to (optically) co-operate with the camera. In FIG. 6, the apparatus 100 is moved further so that a second optical element 220 is aligned to co-operate with the objective 540. At the same time, the corresponding second flash adaptor 250 is aligned to co-operate with the flash light 550. Each of the flash light adaptors can be configured to co-operate with a flash light on the camera when a corresponding one of the optical elements is in the co-operating position with the objective.

In an example embodiment, the different optical elements 210, 220, 230 are formed using one or more of: a lens; a macro objective; a telephoto objective; a wide angle objective; an extended depth of field, edof, objective; an optical filter; a polarizing filter; and mere window without substantial refractive and reflective impact such as an UV-filter.

In one example embodiment, the flash light adaptors 240, 250, 260 are configured to adapt the beam cast by the flash light 550 on the camera suitably for the corresponding optical element that is in the co-operating position with the objective. One or more of the flash light adaptors can comprise a lens; a diffuser; mere window without substantial refractive and reflective impact; or any combination thereof.

Figure 9:
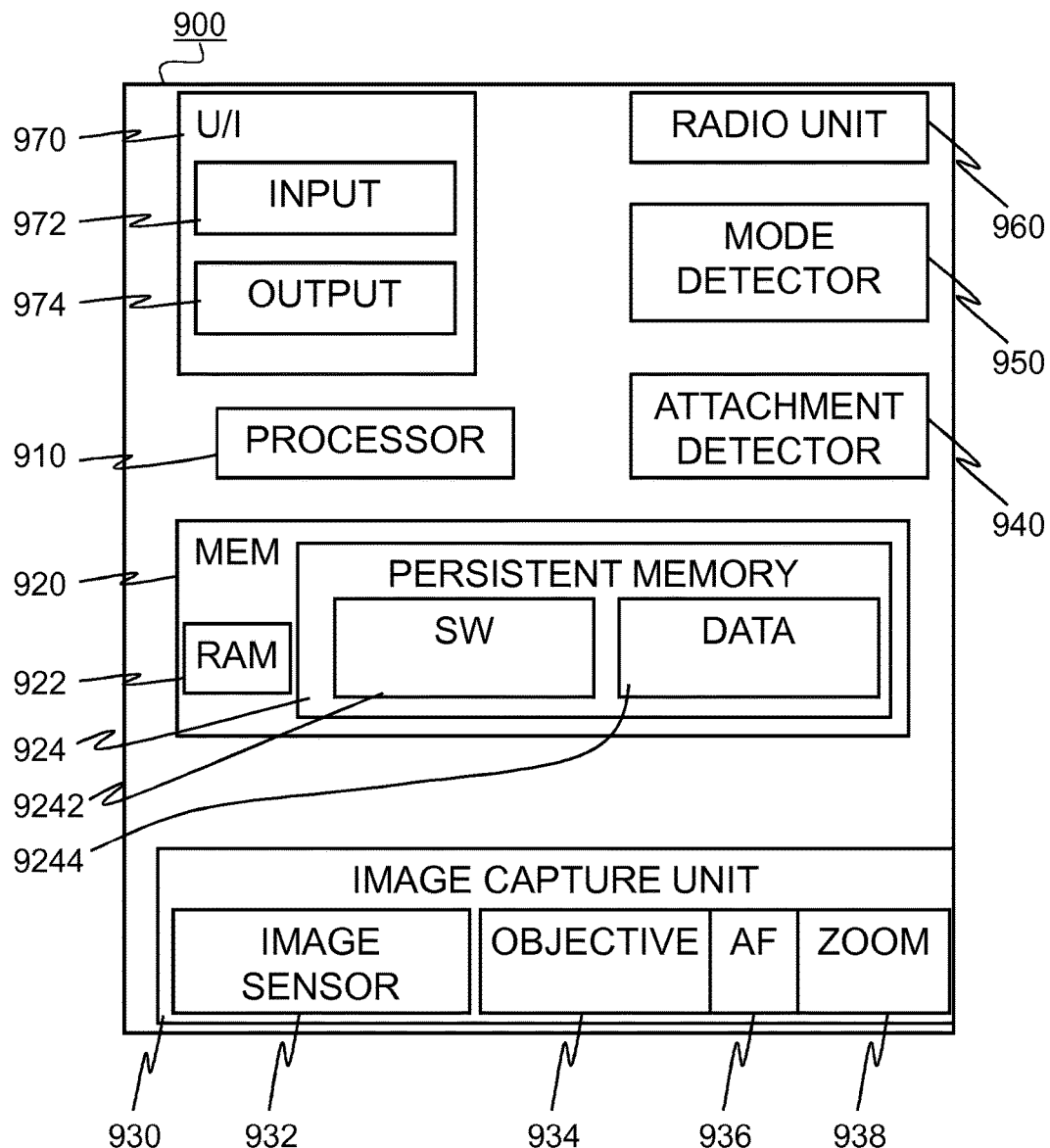
FIG. 9 shows a block diagram of an apparatus of an example embodiment of the invention.

FIG. 9 shows a block diagram of a device 900 of an example embodiment of the invention, suited for use as the camera 500. The device 900 comprises a processor 910 and a memory 920 having a work memory or random access memory 922 and a persistent memory 924 that comprises software 9242 such as operating system, application programs and drivers and that comprises data 9244 such as user preferences and preset data. The device 900 further comprises an image capture unit 930. The image capture unit comprises, for example, an image sensor 932; an objective 934; and optionally an autofocus 936; and/or a zoom 938. The device 900 further comprises in some example embodiments one or more of an attachment detector 940; a mode detector 950 for detecting current optical mode; a radio unit 960 e.g. for cellular communications; and a user interface 970 comprising a user input 972 (e.g. keys, touch screen, speech recognition, gyroscopic sensors, acceleration sensors) and a user output 974 (e.g. display, speaker, tactile response such as vibration or texture change). Various examples on the attachment detector 940 and on the mode detector 950 will be described in more detail in the following with reference to detection of apparatus attachment and/or optical mode.

The processor 910 is configured to control operation of the device 900 according to the software 9242 and the data 9244.

In the foregoing, the apparatus 100 has been described so that the optical elements are passive elements that have no parts that are moving or changing under control of the camera 500. In an example embodiment, the apparatus 100 comprises a liquid floating lens, also referred to as a passive stabilization lens. In an example embodiment, the apparatus 100 comprises one or more active elements such as further flash light(s), autofocus actuator(s), and/or zoom actuator(s).

For operating such active elements, power can be supplied by a power supply comprised by the apparatus 100, such as a battery, solar cell, or radio energy collector, or by the camera 500 over a wired or wireless connection. For controlling such active elements, wired or wireless connection can be arranged between the camera 500 and the apparatus 100.

Mode Indication

In the example embodiment described in the foregoing, a mode indication is provided by the mode indicator 132 formed by the second end part 130. In that example embodiment, the mode indicator is a visual indicator that can be compared by a user with one or more markers on the camera 500. The markers can be permanently visible markers on the camera 500. In another example embodiment shown in FIG. 7, the camera 500 has a display 560 such as a touch screen configured to present one or more markers 562, 564, 566 corresponding to different modes. In this context, the term mode refers to different optical modes or to that different optics is employed by the camera 500 using the optical elements 210, 220, 230. In FIG. 7, three modes are displayed with labels "Tele", "Wide" and "Macro" with reference to corresponding telephoto objective mode, wide angle objective and macro objective, respectively. The display 560 or another element of the camera 500 can be configured to provide a mode indicator adapted to indicate the optical element that is in the co-operating position with the objective.

In one example embodiment, the marker of the current mode is displayed in a distinctive manner e.g. using higher brightness, inverse colors, and/or different colors than the other mode markers. In one example embodiment, only the current mode marker is shown while others are concealed. In one example embodiment, the mode markers are enabled when the apparatus 100 is attached to the camera 500. To this end, the apparatus 100 and/or the camera 500 are particularly adapted in one example embodiment to automatically detect that the apparatus 100 is attached to the camera 500.

The mode indicator is configured in one example embodiment to indicate a property of the optical element (e.g. focal length or maximum shutter aperture) that is in the co-operating position with the objective.

The apparatus 100 is configured in one example embodiment to provide a tactile response for facilitating alignment of the apparatus 100 with the camera 500. For example, one or more buttons or other distinctive shapes of the camera 500 can be configured to cause a perceivable resistance or reduction of resistance in moving the apparatus 100 with relation to the camera 500 when attached thereto. In one example embodiment, the groove 132 is formed to cause the apparatus 100 to slightly engage with one or more of the buttons or other distinctive shapes on the camera 500 when an optical element 210, 220, 230 is aligned with the objective 540. In yet another example embodiment, the camera 500 is configured to detect when the apparatus 100 is aligned with the camera 500 in one of the optical modes and to issue a tactile response e.g. using a vibration element or by altering its shape or texture.

The apparatus 100 is configured in one example embodiment to provide an audible response for facilitating alignment of the apparatus 100 with the camera 500. This is implemented in one example embodiment by a simple mechanical structure (comprised by the apparatus 100 and/or by the camera 500) that causes a snap action when the apparatus 100 becomes aligned with the camera 500 in a position corresponding to one of the optical modes. In another example embodiment, the camera 500 comprises an electric acoustic feedback element such as a speaker or piezo-electric element configured to issue an acoustic feedback when the apparatus 100 becomes aligned with the camera 500 in a position corresponding to one of the optical modes.

Flash Light Adaptation

Looking at FIGS. 5 and 6, it is seen how in each different mode a pair of one optical element (210, 220, 230) and one flash light adaptor (240, 250, 260) can be aligned with the objective 540 and with the flash light 550, respectively. In the mentioned telephoto mode, the corresponding flash light adaptor can focus the flash light so as to enhance illumination of the image area. Correspondingly, in the wide angle mode, the flash light adaptor can widen the scope of the flash light 550 so as to enhance illumination of the entire image area. In some modes, the flash light adaptor can additionally or alternatively be configured to further diffuse the flash light.

In an example embodiment, one or both of the optical element and corresponding flash light adaptor is colored to form a desired tone in images being taken.

Detection of Apparatus Attachment and/or Optical Mode

In an example embodiment, the apparatus 100 comprises an attachment indicator (ref. 940 in FIG. 9). The attachment indicator comprises, for example, a wireless communication unit such as a near field communication unit; a Bluetooth communication unit; and/or a touch indicator configured to co-operate with a touch detection surface on the camera.

In an example embodiment, the camera 500 comprises an optical mode detector (see 950 in FIG. 9) configured to automatically detect current optical mode. The optical mode detector comprises, for example, a wireless communication unit such as a near field communication unit; an image capture unit; a Bluetooth communication unit; and/or a touch indicator configured to co-operate with a touch detection surface on the camera.

For position detection or mode indication, the mode indicator 132 shown in FIGS. 1 to 7 is equipped in one example object with a wireless indication unit. The wireless indication unit is in an example embodiment a detection object such as a small metal element configured to cause in its location a change in capacitance of the touch screen 560. In another example embodiment, in which a pressure sensitive touch screen is used, the detection object can be integrally formed e.g. of a suitable shape on the mode indicator 132. In these two embodiments, the touch screen 560 is used in detection of the position of the mode indicator 132. In another example embodiment, a dedicated detection circuitry is employed. For example, the apparatus 100 is equipped in an example embodiment with one or more of: discrete hall elements; optical switches; photo reflectors; and/or a touch sensor; or any combination thereof. A suitable discrete sensing element can be provided in the camera 500 to detect a signal indicative of the apparatus 100 being moved along the side surface of the camera 500. In one example embodiment, the same discrete sensing element is used to work for other user interface purpose, such as scroll movements, volume adjustment key, camera zoom, and/or display lock, for example, when the apparatus 100 is attached to the camera 500.

In an example embodiment in which the Bluetooth communication unit is used for detection of the current optical mode, sufficiently accurate alignment is attained, for example, by forming an antenna detuning/tuning circuitry that significantly alters the operation of the Bluetooth communication unit when the apparatus 100 is aligned with the camera 500 in one of the imaging modes.

In an example embodiment, the touch indicator is configured to co-operate with the touch detection surface of the camera at a rim of the display of the camera so that the optical mode detector need not extend onto the display area in which changing information can be displayed to the user. In yet another example embodiment, the camera has touch detection surfaces on two or more sides, e.g. on a face side when (the side with the display in FIG. 5) and an edge (in FIG. 5, the side with buttons 510, 520, 530).

In one example embodiment, the mode detector comprises an inductive and/or capacitive coupling that is configured to cause a coupling when the apparatus 100 is aligned with the camera 500 in one of the imaging modes.

The image capture unit (reference sign 930 in FIG. 9) of the camera 500 can also be used to detect current image unit. For instance, the apparatus 100, when attached to the camera 500 and moved to match with the objective 540, can be configured to trigger detection by any attachment indication technique. In an example embodiment, the camera 500 comprises a mode indication input (e.g. user interface input 952 in FIG. 9) configured to receive a mode indication from a mode indicator from a sliding accessory lens mount 110, when the sliding accessory lens mount is attached to the apparatus 100 such that one of different optical elements is moved to a co-operating position with the objective. The imaging unit can responsively determine a change of the image seen through the objective 540 indicative of movement of an optical element 210, 220, or 230 in optical series with the objective 540. By triggering such detection with the attachment indication, continuous monitoring can be avoided. In another example embodiment, though, camera 500 is configured to use the imaging unit to continuously monitor changes indicative of engaging one of the optical elements in the optical series.

Camera Operation

In an example embodiment, the camera is configured to perform an automatic mode adjustment to suit with the optics formed by the objective and the optical element that is moved to the co-operating position with the objective. The automatic mode adjustment comprises, for example, presetting autofocus search to a given initial position; disabling or enabling autofocus (e.g. in telephoto mode, the focus may be set to range n meters to infinity); disabling or enabling flash light; and/or adjusting the exposure time and/or sensor sensitivity (ISO value setting).

In an example embodiment, the camera is configured to adapt the presentation of imaging related options and to input user commands. Such imaging related options comprise, for example, one or more of: exposure time; flash light mode; auto focus activation; optical image stabilization activation; zoom control; and shutter aperture value. For instance, with telephoto mode, optical image stabilization can be set on by default to avoid motion blur. In another example embodiment, the optical image stabilization activation is set off by default, if the objective 540 of the camera 500 is moved by the optical image stabilization, to avoid further image defects caused by changing angle between an optical element 210, 220, 230 and the objective 540. As another example, the aperture value is increased and the exposure time set as low as possible with ISO values with which major noise can still be avoided.

According to an example embodiment, a processor (reference sign 910 in FIG. 9) of the camera 500 is configured to automatically determine one or more imaging parameters based on the mode indication and to correspondingly control the operation of one or more of the objective; and the image capture unit. In an example embodiment in which the camera comprises a flash light, the processor can be configured to perform the determining of the one or more imaging parameters based on the mode indication and to correspondingly control the operation of one or more of the objective; the flash light; and the image capture unit.

The one or more imaging parameters comprise, for example: an exposure time parameter; a focusing parameter; a zooming parameter; a flash light control parameter; and/or a vignetting correction parameter. The vignetting correction parameter is, for example, a parameter that defines which part of images should be maintained.

For example, with a telephoto objective being added in series with the objective of the camera 250, the image quality produced may become too poor near the edges of the image. This defect can be automatically compensated by cropping the edges off.

The camera 500 is further provided in an example embodiment with a user interface 970 in FIG. 9 configured to present imaging related options and to input user commands. In an example embodiment, the processor 910 of the camera is further configured to adapt the presentation of the imaging related options corresponding to the optical element that is in the co-operating position with the objective. In yet further example embodiment, the processor 910 is further configured to cause recording in images captured by the image capture unit metadata indicative of the combined optical properties of the objective and the optical element that is in the co-operating position with the objective.

The camera 500 further comprises in an example embodiment a cellular communication unit. The camera 500 can then be configured to send to a remote recipient images taken with the apparatus 100 over a cellular communication connection.

In an example embodiment, the processor 910 is configured to cause the camera to present dual settings for each of the lenses: Super macro, EDOF and Narrow-DOF wide and telephoto mode. These dual settings are implemented, for example, by setting the camera's own lenses to either end of their linear lens path. These settings can be subsequently changed by the user using the user interface of the camera.

Figure 10:
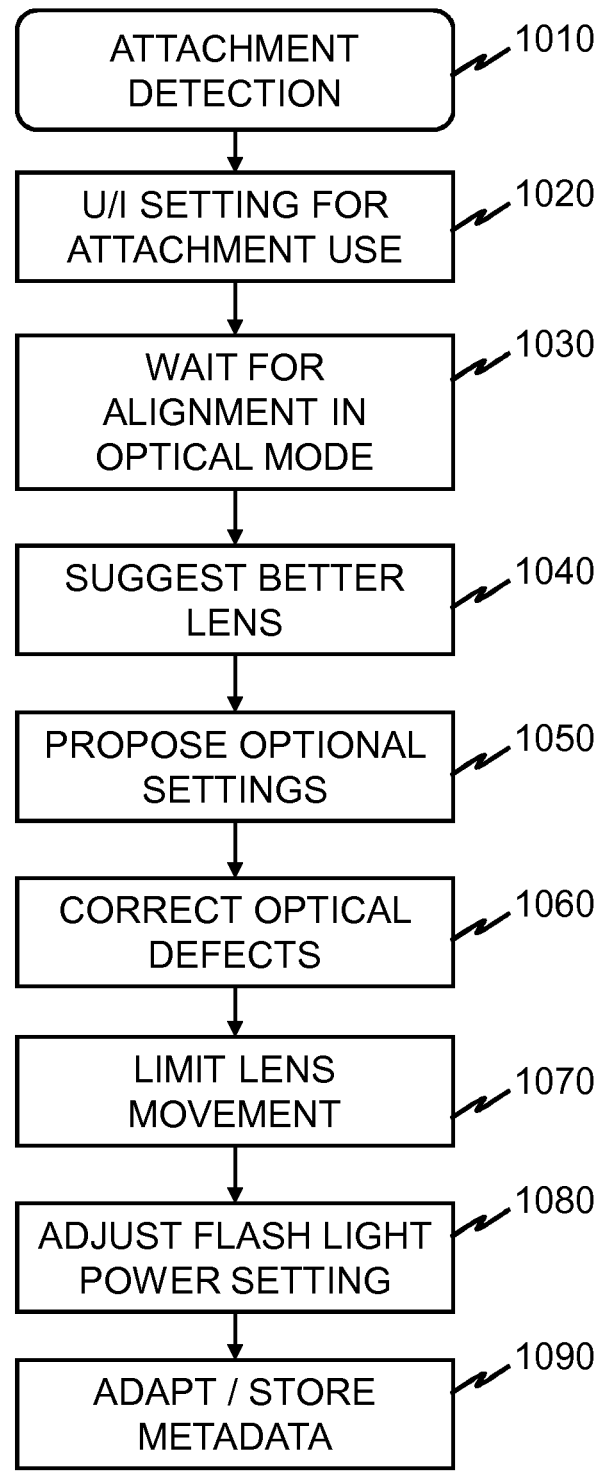
FIG. 10 shows a flow chart of a process of an example embodiment of the invention.

FIG. 10 shows a flow chart of a process of an example embodiment of the invention. In step 1010, the attaching of the apparatus 100 to the camera 500 is detected e.g. through a user input received through the user interface of the camera or through automatic detection.

In step 1020, the user interface of the camera is set for so-called attachment use with predetermined lens position tags and menus.

In step 1030, it is waited until the user aligns the apparatus with relation to the camera to one of the optical modes in which the apparatus optically co-operates with the camera objective.

In step 1040, the processor 910 checks if a better lens should be taken in use and optionally also causes the user interface to advise the user which if any optical elements of the apparatus 100 should be used. In this checking, the processor 910 can be configured to use any of the following information: detected image objects such as persons; relative size of detected image objects; ambient light level; ambient white balance; extent of camera shake; current zoom setting; and user input such as desired exposure time, ISO value and/or serial shooting mode. Alternatively, or additionally, in this step the processor 910 can be configured to check the positioning of the optical elements e.g. by testing that the objective 540 is not shadowed by a mis-aligned optical element.

In step 1050, the processor 910 checks if under prevailing circumstances some optional settings should be proposed to the user. For instance, motion blur detection can be used to suggest shorter exposure time. Additionally or alternatively, scene detection can be used to suggest another camera preset program such as landscape or portrait program in which color tones, shutter aperture setting and/or flash light use are suitably adapted.

In step 1060, the processor 910 corrects possible optical defects such as vignetting problems. The correction can be performed e.g. by automatically cropping image to the display and optionally by setting lenses of the objective to their optimal initial position, such as Hyper Focal position. In some cases, the correction can be performed by suitable zoom and/or autofocus action.

The processor 910 further limits 1070 in the movement of the lenses of the objective 540 of the camera to a proper lens-based range as is predetermined for the combination of the objective 540 and the optical element 210, 220, 230 added in series with the objective 540 by the apparatus 100. This limitation may avoid forming of excessive image distortion.

The processor 910 further adjusts 1080 flash light power setting based on the current combined optics formed by the objective 540 and the optical element 210, 220, 230 in series with the objective 540, and optionally also taking into account the flash light adaptor 240, 250, 260 that is in series with the flash light of the camera 500.

When an image is taken, an exif, or alike, metadata are stored 1090 with the image to describe characteristics of the combined optics (and optionally the combined optics for the flash light as provided by a flash light adaptor if present), such as focal length and other parameter values.

Without in any way limiting the scope, interpretation, or application of the claims appearing below, a technical effect of one or more of the example embodiments disclosed herein is that optical properties of a camera can be modified by a user conveniently and without tools. Another technical effect of one or more of the example embodiments disclosed herein that is optical properties of the camera can be modified by a user between a plurality of different alternatives with a single hand movement.

Another technical effect of one or more of the example embodiments disclosed herein that is optical elements used for modifying optical properties of the camera are kept, when the apparatus 100 is attached to the camera 500, against the camera body so that their presence forms little if any hindrance for normal operation of the camera 500. Another technical effect of one or more of the example embodiments disclosed herein is that optical properties of a camera can be modified both with regard to the objective 540 and with regard to the flash light 550 of the camera 500. Another technical effect of one or more of the example embodiments disclosed herein is that images can be automatically corrected by the processor 910 to reduce or correct optical defects in the images taken with the camera 500 with an optical element 210, 220, 230. Yet another technical effect of one or more of the example embodiments disclosed herein is that the quality of images can be further improved by automatically checking correct alignment of the optical element with relation to the objective; by advising the user of better suitably lens or lens combination; and by automatically adjusting imaging parameters according to used combination of objective and optical element. The disclosed example embodiments provide a host of further technical effects and advantages that become apparent to a normally skilled person when implementing the various example embodiments taught by the present document. Hence, the few technical effects listed in this paragraph are not to be construed as an exhaustive list.

Embodiments of the present invention may be implemented in software, hardware, application logic or a combination of software, hardware and application logic. The software, application logic and/or hardware may reside on the persistent memory 9242. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 9. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. A device comprising a camera, the camera comprising:
   an objective;
   an image capture assembly;
   an attachment indicator configured to detect attaching of a sliding accessory lens mount to the device;
   an optical mode detector configured to receive an optical mode indication from an optical mode indicator of the sliding accessory lens mount such that one of different optical elements is linearly moved to a co-operating position with the objective;
   a touch detection surface, wherein the device is configured to detect a detection object of the optical mode indicator proximate the touch detection surface, and wherein the device is configured to use the touch detection surface for detection of a position of the mode indicator; and
   a processor configured to automatically determine one or more imaging parameters based on the optical mode indication and to correspondingly control the operation of one or more of the objective and the image capture assembly.

2. The device of claim 1, wherein the camera further comprises a flash light and the processor is configured to perform the determining of the one or more imaging parameters based on the optical mode indication and to correspondingly control the operation of one or more of the objective; the flash light; and the image capture assembly.

3. The device of claim 1, wherein the optical mode indication is received from the optical mode indicator from an accessory lens mount.

4. The device of claim 1, wherein the processor is configured to perform the determining of the one or more imaging parameters based on the optical mode indication and on image information produced by the image capture assembly.

5. The device of claim 1, the one or more imaging parameters being selected from a group consisting of: an exposure time parameter; a focusing parameter; a zooming parameter; a flash light control parameter; and a vignetting correction parameter.

6. The device of claim 1, further comprising a user interface configured to present imaging related options and to input user commands.

7. The device of claim 6, wherein the processor is further configured to adapt the presentation of the imaging related options corresponding to the optical element that is in the co-operating position with the objective.

8. The device of claim 7, wherein the imaging related options comprise one or more of: exposure time; flash light mode; auto focus activation; optical image stabilization activation; zoom control; and shutter aperture value.

9. The device of claim 6, wherein the processor is further configured to cause recording with images captured by the image capture assembly metadata indicative of the combined optical properties of the objective and the optical element that is in the co-operating position with the objective.

10. The device of claim 1, further comprising a cellular communication unit.

11. An apparatus comprising:
an objective;
an image capture assembly;
an attachment indicator configured to detect attaching of a sliding accessory lens mount to the apparatus;
an optical mode indication input configured to receive an optical mode indication from an optical mode indicator, when the sliding accessory lens mount is attached to the apparatus such that one of different optical elements is moved to a co-operating position with the objective;
a touch detection surface, wherein the apparatus is configured to detect a detection object of the optical mode indicator proximate the touch detection surface, and wherein the apparatus is configured to use the touch detection surface for detection of a position of the mode indicator; and
a processor configured to automatically determine one or more imaging parameters based on the optical mode indication and to correspondingly control the operation of one or more of the objective and the image capture assembly.

12. A method comprising:
detecting, with an attachment indicator, attaching of a sliding accessory lens mount to a camera, the camera having an objective; wherein the sliding accessory lens mount has a plurality of different optical elements attached thereto such that each of the different optical elements is linearly movable to a co-operating position with the objective by the sliding accessory lens mount to a corresponding position by a user;
detecting, with a touch detection surface, a detection object of an optical mode indicator of the sliding accessory lens mount proximate the touch detection surface, and wherein the touch detection surface is used for detection of a position of the mode indicator; and
indicating optical mode of optics of the camera; and
automatically adjusting optical mode of the camera to suit with the optics formed by the objective and the optical element that is linearly moved to the co-operating position with the objective.

13. The method of claim 12, wherein the indication of the optical mode is performed using touch indicator configured to co-operate with the touch detection surface on the camera.

14. The method of claim 12, further comprising indicating to a user of the camera the optical element that is in co-operating position with the objective.

15. The method of claim 12, further comprising adapting flash light on the camera when one of the optical element is in the co-operating position with the objective.

16. The method of claim 15, further comprising adapting beam cast by the flash light on the camera suitably for the optical element that is in the co-operating position with the objective.

17. The method of claim 12, further comprising indicating to the user the optical element that is in the co-operating position with the objective.

18. A computer program product comprising a non-transitory computer readable memory medium bearing computer program code embodied therein for use with a computer, the computer program code comprising code for performing the method of claim 12.

19. A method comprising:
in a camera having an objective and an image capture assembly:
receiving an optical mode indication from an optical mode indicator of a sliding accessory lens mount, when the accessory lens mount is attached to the device such that one of different optical elements is linearly moved to a co-operating position with the objective, wherein the device comprises an attachment indicator configured to detect attaching of the sliding accessory lens mount to the device;
detecting, with a touch detection surface, a detection object of an optical mode indicator of the sliding accessory mount proximate the touch detection surface, and wherein the device is configured to use the touch detection surface for detection of a position of the mode indicator; and
automatically determining one or more imaging parameters based on the optical mode indication; and correspondingly controlling the operation of one or more of the objective and the image capture assembly.

20. The method of claim 19, further comprising performing the determining of the one or more imaging parameters based on the optical mode indication and correspondingly controlling the operation of a flash light of the camera.

21. The method of claim 19, wherein the determining of the one or more imaging parameters is based on the optical mode indication and on image information produced by the image capture assembly.

22. The method of claim 19, wherein the one or more imaging parameters comprise one or more of: an exposure time parameter; a focusing parameter; a zooming parameter; a flash light control parameter; a vignetting correction parameter.

23. The method of claim 19, further comprising presenting imaging related options and inputting user commands.

24. The method of claim 23, further comprising adapting the presentation of the imaging related options corresponding to the optical element that is in the co-operating position with the objective.

25. The method of claim 24, wherein the imaging related options comprise one or more of: exposure time; flash light mode; auto focus activation; optical image stabilization activation; zoom control; and shutter aperture value.

26. The method of claim 19, further comprising recording with images captured by the image capture assembly metadata indicative of the combined optical properties of the objective and the optical element that is in the co-operating position with the objective.

* * * * *